Dec. 14, 1926. 1,610,929

J. F. CAVANAGH

ANTIRATTLING DEVICE

Filed June 5, 1926

Inventor:
John F. Cavanagh
By
Attorneys.

Patented Dec. 14, 1926.

1,610,929

UNITED STATES PATENT OFFICE.

JOHN F. CAVANAGH, OF PROVIDENCE, RHODE ISLAND, ASSIGNOR TO APCO MANUFACTURING COMPANY, OF PROVIDENCE, RHODE ISLAND, A CORPORATION OF RHODE ISLAND.

ANTIRATTLING DEVICE.

Application filed June 5, 1926. Serial No. 114,032.

This invention relates to anti-rattling devices for use on the steering-connections and radius-rods of automobiles and consists of improvements in the construction and method of operation of the same.

A principal object of the invention is to provide a device of the type specified for connecting the parts of the steering-gear of the vehicle to provide for their normal operation while preventing play and lost motion, due to wear or other causes, whereby to eliminate vibration and rattling.

Another object of the invention is to provide a device of the type specified having resilient pressure-means for restraining the parts from undue play and chattering, which means is adapted for adjustment to regulate the degree of pressure applied without removing the device or disconnecting any of its parts.

Further objects of the improvement are set forth in the following specification, which describes a preferred embodiment of the invention as illustrated by the accompanying drawings. In the drawings.

Figure 1:
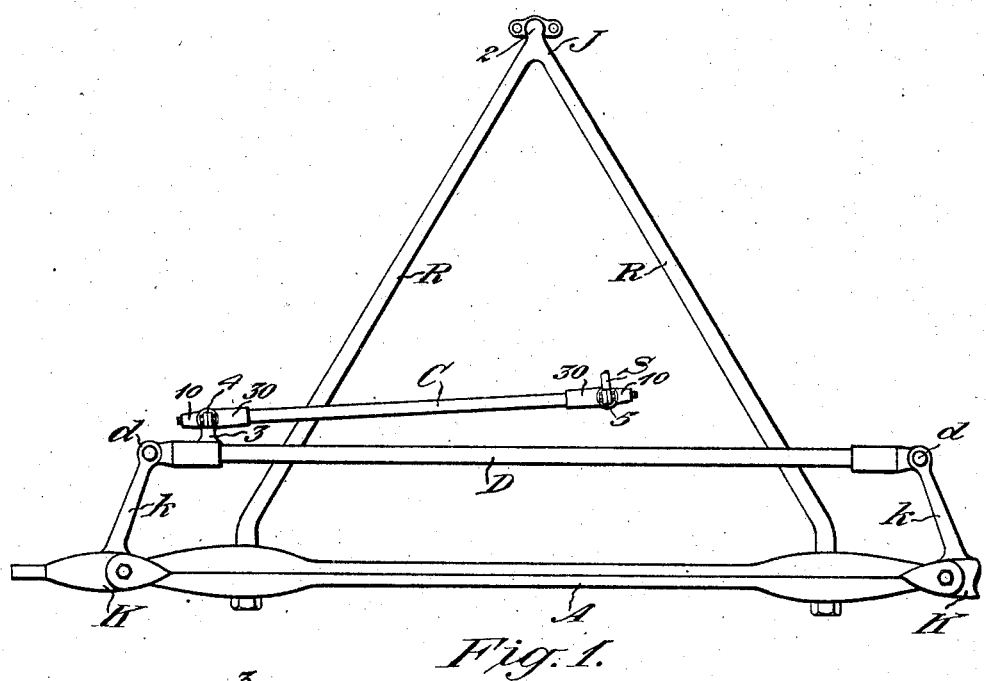
Fig. 1 is a plan view of a portion of the running-gear of a motor vehicle showing its front axle, the radius-rods for bracing the axle from the chassis, and certain parts of the steering-gear with which the present improved anti-rattling device is adapted for use.

Referring to Fig. 1 of the drawings, A designates the front axle of an automobile of the Ford type and K, K are the steering-knuckles pivoted to its ends. Connecting the arms $k$, $k$ of the steering-knuckles K, K is a distance-rod or drag-bar D which is pivoted to the ends of the arms at $d$, $d$. Extending rearwardly from the axle A are two radius-rods R, R which converge to a joint J having a ball-end 2 by means of which the rods are pivotally secured to some part of the chassis of the automobile, for instance to the under side of the transmission-case. At one end of the drag-bar D is a projecting arm 3 formed with a ball-end 4 for joining it to a steering-rod C. The steering-rod C extends from a crank-arm S which is operated from the steering-post of the vehicle, not herein shown. The crank-arm S terminates in a ball-end 5 for connecting it to the steering-rod C, and the present improved device is adapted for use on both ends of the steering-rod as well as on the ball-joint of the radius-rods R, R, previously described.

The usual method of joining the steering-rod C to the drag-bar D and steering-arm S is by means of a split socket-bearing having its opposite parts bolted together to enclose the sides of the ball-end on these parts. The same arrangement is also used on the ball-joint at the ends of the radius-rods, and during the operation of the vehicle these couplings are subjected to considerable stress and strain. The socketed bearings for the ball-ends therefore soon become worn, so that there is undue play and lost motion between the parts which results in rattling and chattering as the vehicle is driven over uneven roads or rough pavement. To correct this condition it has already been proposed to employ a slidable spring-pressed plunger in the socketed clamp which bears against the ball-end whereby to take up the wear between the parts. The present invention relates to a device of this type and the improvement consists in providing a housing for the spring-pressed anti-rattling plunger wherein are embodied means for adjusting the tension of the spring without removing the clamp or housing or disconnecting any of the other parts of the device.

Figure 2:
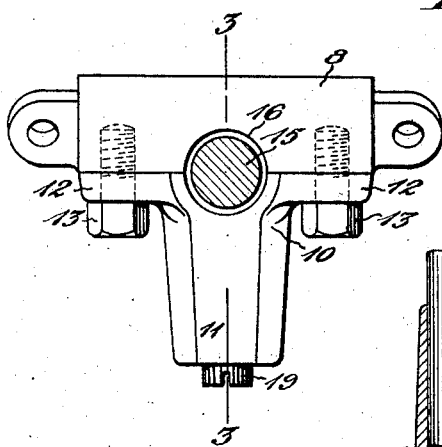
Fig. 2 is a side view of the complete anti-rattling device shown as adapted for use at the point of joinder of the radius-rods with the chassis.
Figure 3:
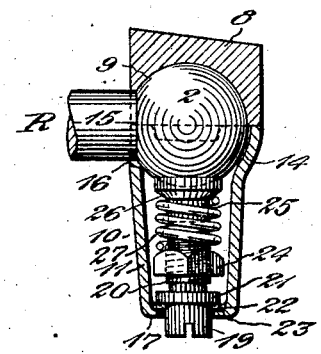
Fig. 3 is a cross-sectional view of the same taken on line 3—3 of Fig. 2.
Figure 5:
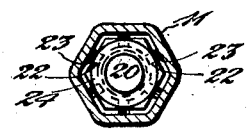
Fig. 5 is a detailed sectional view of a portion of the device taken on line 5—5 of Fig. 4.

As illustrated in Figs. 2 and 3 of the drawings, 8 designates the socketed block or bearing which is bolted to the under side of the transmission-case of the automobile and provided with a hemispherical recess 9 for receiving the ball-end 2 at the joinder of the radius-rods R, R. In place of the usual socketed cap which fits over the ball 2 and bolts to the bearing 8 my improved device employs a housing or cap 10 constructed as next described. The housing 10 comprises a pocket-like casing 11 provided with suitable ears 12 on its sides which are bored to receive bolts 13 for fastening it to the underside of the bearing 8. The casing 11 is hollowed out in hemispherical form at 14 to adapt it to enclose a portion of the ball 2 without contact therewith, and the neck 15 which connects the ball to the rods R, R projects through a lateral aperture 16 in the side of the casing and bearing 8. The casing 11 projects downwardly with its walls tapering slightly toward the bottom and shaped to a hexagonal contour in cross-section as illustrated in Fig. 5.

In the bottom of the casing 11 is a circular hole 17 adapted to receive the slotted head 19 of a stud 20 which extends axially of the casing in the direction of the ball-end 2. The head 19 of the stud 20 is formed with a projecting rim or flange 21 which abuts the bottom of the casing 11 to hold the stud in place therein. On the under side of the flange 21 are beveled protuberances or detent-lugs 22 which are adapted to seat in notches or recesses 23 formed in the bottom or end wall of the casing 11. The recesses 23 cooperate with the detent-lugs 22 in the manner of a ratchet, whereby to normally hold the stud 20 from turning in the bore or aperture of the casing 11. The stud 20 is exteriorly threaded to adapt it to receive a nut 24 which is adjustable thereon for a purpose as later described.

Adapted to bear against the exterior of the ball-end 2 is a plunger 25 having a recessed head 26 for closely fitting the surface of the ball. A relatively heavy helical spring 27 surrounds the shank of the plunger 25 with its opposite end held on the end of the stud 20 abutting the nut 24.

In assembling the anti-rattling device on the ball-end 2 of the radius-rods R, R the stud 20 is placed in position in the casing 11 with the spring 27 held on its upper end and the plunger 25 seated in the opposite end of the spring. The complete housing 10 is then placed in position as shown in Fig. 2 and the bolts 13 inserted through the holes in the ears 12 and screwed into the bearing 8 to clamp the housing thereagainst. As the bolts are set up to draw the housing into place the spring 27 will be compressed to cause it to force the head of the plunger 25 snugly against the ball-end 2. The pressure of the spring thus tends to hold the ball 2 snugly in the socket 9 of the bearing-member 8 to prevent it from vibrating or chattering. When the ball and its socket become worn so that there is any considerable play or lost motion between the ball and its bearing-member the device is adjusted to increase the tension of the spring 27. This adjustment of the spring can be performed very readily and conveniently by simply turning the stud 20 in its bearing in the casing 11. A screw-driver is inserted in the slot in the head 19 of the stud 20 and when a turning movement is applied thereto the ratchet protuberances or detents 22 on the flange 21 will ride up out of their notches 23 in the end of the casing 11 under the yielding action of the spring 27. That is to say, the pressure of the spring 27 normally holds the detents 22 engaged in their notches 23, but when the stud 20 is turned the spring permits it to move longitudinally whereby the detents operate with a ratchet action with respect to the sockets 23. In this way the stud 20 can be turned to the extent required to adjust the nut 24 longitudinally thereof to contract the spring 27 to the desired amount. It is to be understood that the nut 24 fits within the hexagonal sides of the casing 11 with only a slight clearance therebetween. The casing 11 therefore holds the nut 24 from turning when the stud 20 is turned so that the nut will be adjusted longitudinally of the stud to compress the spring to increase its tension. It will thus be seen that the tension of the spring may be adjusted to control the pressure of the plunger on the ball-end 2 without removing the cap or housing 10 or without disconnecting any of the other parts of the device.

Figure 4:
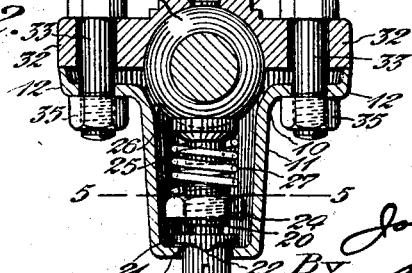
Fig. 4 is a longitudinal sectional view of the device shown as adapted for use with the steering-connections.

In Fig. 4 of the drawings the housing 10 is illustrated as applied to the end of the steering-rod C to couple it to the ball-end 4 of the drag-bar D, and to connect its opposite end to the ball-end 5 of the steering-arm S. The housing 10 is identical in form and structure to the embodiment illustrated in Figs. 2 and 3 as adapted for use with the ball-end 2 of the radius-rods. The end of the steering-rod C carries a fitting or socket-member 30 having a hollow shank surrounding the rod and provided with a socketed bearing 31 at its end. On the sides of the bearing 31 are ears 32 provided with holes for receiving bolts 33. The bolts 33 extend through the apertured ears 12 on the housing 10 with nuts 35 at their ends for drawing the parts together. In this embodiment of the device the plunger 25 is held in the housing 10 in the same manner as above described to adapt it to bear on the ball-end 4 with the spring 27 forcing it thereagainst. The stud 20 is likewise adapted to be turned to adjust the nut 24 to regulate the pressure of the spring.

It will be observed from the above that my invention provides an extremely simple and compact device for housing the spring-pressed plunger which serves as the means for preventing vibration or rattling of the ball-and-socket joint. The present improvement provides for adjusting the pressure of the spring without removing the housing or disconnecting any of the parts and thus makes for greater ease and convenience in applying the device to use and for regulating its action to compensate for wear. Moreover, the device is particularly neat in appearance while the operating parts of the mechanism are entirely enclosed and protected from dirt, mud and water. The housing or casing for the operating plunger and its spring provides a pocket or reservoir for grease which maintains the parts lubricated to reduce the wear on the ball and its socket.

While I have herein illustrated a preferred embodiment of the improved device it is to be understood that various modifications may be made in the structure and arrangement of its parts without departing from the spirit or scope of the invention. Therefore, without limiting myself in this respect, I claim:

1. An anti-rattling device for ball-and-socket joints comprising in combination with a socketed bearing-member and a ball received therein, a housing adapted to be attached to said bearing-member, a plunger slidable in the housing, a screw rotatable in one end of the housing, a nut on said screw, a spring compressed between the plunger and nut, means for holding the nut from turning in the housing, and means for normally holding the screw from rotation while permitting it to be turned to adjust the nut to regulate the tension of the spring.

2. In a device of the type specified, the combination with a socketed-bearing and a ball one side of which is received therein, of a housing enclosing the opposite side of the ball and provided with a pocket, a plunger slidable in said pocket to adapt it to bear against the ball, a spring for holding the plunger against the ball, a nut in the pocket, means for holding the nut from turning in the pocket, a screw engaging the threads of the nut and projecting through the pocket, and ratchet-means operative between the screw and the housing to normally hold the screw from turning while permitting its manual adjustment to displace the nut to regulate the tension of the spring.

3. In a device of the type specified, the combination with a socketed-bearing and a ball received therein, of a housing formed with a hexagonally shaped pocket, a screw extending through one end of the pocket, a nut on said screw held from turning by the walls of the pocket, a spring on the screw arranged with one end abutting the nut, a plunger at the opposite end of the spring adapted to bear against the ball, notches in the pocket, and detents on the screw adapted to engage said notches to normally hold the screw from turning while permitting its manual adjustment to displace the nut to regulate the tension of the spring.

4. In a device of the type specified, the combination with a socketed-bearing and a ball seated therein, of a housing having means for attaching it to said bearing, said housing provided with a pocket extending radially from the ball and formed with hexagonal walls, and notches at one end thereof, a stud in the pocket having a head projecting through one end of the pocket and provided with a flange abutting said end of the pocket to hold the stud in place therein, a nut on said stud held from turning by the hexagonal walls of the pocket, a spring on one end of the stud abutting the nut, a plunger at the opposite end of the spring adapted to bear against the ball, and detent-means on the stud adapted to engage the notches in the pocket to normally restrain the stud from turning therein while allowing its adjustment to displace the nut to regulate the tension of the spring.

In testimony whereof I affix my signature.

JOHN F. CAVANAGH.